(12) United States Patent
Li et al.

(10) Patent No.: US 12,019,153 B2
(45) Date of Patent: Jun. 25, 2024

(54) DUAL-POLARIZATON RADAR

(71) Applicant: ZHEJIANG EASTONE WASHON TECHNOLOGY CO., LTD., Shaoxing (CN)

(72) Inventors: Sai Li, Shaoxing (CN); Kai Ning, Shaoxing (CN); Zhen Wang, Shaoxing (CN); Huaicheng Cun, Shaoxing (CN)

(73) Assignee: ZHEJIANG EASTONE WASHON TECHNOLOGY CO., LTD., Shaoxing (CN)

( * ) Notice: Subject to any disclaimer, the term of this patent is extended or adjusted under 35 U.S.C. 154(b) by 358 days.

(21) Appl. No.: 17/420,664

(22) PCT Filed: Oct. 17, 2019

(86) PCT No.: PCT/CN2019/111716
§ 371 (c)(1),
(2) Date: Jul. 2, 2021

(87) PCT Pub. No.: WO2020/224191
PCT Pub. Date: Nov. 12, 2020

(65) Prior Publication Data
US 2022/0099827 A1    Mar. 31, 2022

(30) Foreign Application Priority Data
May 5, 2019    (CN) .......................... 201910366778.7

(51) Int. Cl.
*G01S 13/95*    (2006.01)
*G01S 7/282*    (2006.01)

(52) U.S. Cl.
CPC .............. *G01S 13/95* (2013.01); *G01S 7/282* (2013.01)

(58) Field of Classification Search
CPC .................................. G01S 13/95; G01S 7/282
See application file for complete search history.

(56) References Cited

U.S. PATENT DOCUMENTS 8,345,716 B1 *   1/2013   Ehret ....................... H04B 7/10
                                                                    455/562.1
10,725,164 B1 *  7/2020   Bradley ................ G01S 13/103
(Continued)

FOREIGN PATENT DOCUMENTS

| CN | 103323850 A | 9/2013 |
|----|----|----|
| CN | 105717493 A | 6/2016 |

(Continued)

OTHER PUBLICATIONS

International Search Report Issued in International Application No. PCT/CN2019/111716 dated Jan. 17, 2020, 2 pages.

*Primary Examiner* — Bernarr E Gregory
*Assistant Examiner* — Hailey R Le
(74) *Attorney, Agent, or Firm* — MASCHOFF BRENNAN; Michael Mauriel

(57) ABSTRACT

A dual-polarization radar is disclosed. Selected embodiments provide a radar structure having a single receiving channel and enabling alternate transmission and simultaneous reception. Selected embodiments use a first polarization direction antenna and a second polarization direction antenna to transmit and receive a first polarization direction echo signal and a second polarization direction echo signal. The first polarization direction echo signal and the second polarization direction echo signal are received and synthesized by a synthesis module, which transmits the synthesized signal as the backscattered echo signal to a receiving module.

13 Claims, 2 Drawing Sheets

(56) References Cited

U.S. PATENT DOCUMENTS

| | | | | |
|---|---|---|---|---|
| 2009/0074119 | A1* | 3/2009 | Nekoogar | H04B 1/71632 |
| | | | | 375/259 |
| 2010/0045509 | A1* | 2/2010 | Shinonaga | G01S 13/528 |
| | | | | 342/160 |
| 2019/0064335 | A1* | 2/2019 | Boutin | G01S 7/023 |
| 2019/0064356 | A1* | 2/2019 | Yoon | G01S 17/10 |
| 2020/0025923 | A1* | 1/2020 | Eichenholz | G01S 17/931 |
| 2020/0395686 | A1* | 12/2020 | Jamin | H01Q 5/28 |
| 2021/0132197 | A1* | 5/2021 | Wachter | G01S 17/04 |

FOREIGN PATENT DOCUMENTS

| | | | | |
|---|---|---|---|---|
| CN | 105785371 | A | | 7/2016 |
| CN | 106772335 | A | | 5/2017 |
| CN | 107526063 | A | | 12/2017 |
| CN | 110146892 | A | | 8/2019 |
| GB | 2463774 | A | * 3/2010 | ............ G01S 13/22 |
| WO | 2004/086075 | A2 | | 10/2004 |

\* cited by examiner

DUAL-POLARIZATON RADAR

CROSS-REFERENCE TO RELATED APPLICATIONS

The present application is a U.S. National Phase application under 35 U.S.C. § 371 of International Application No. PCT/CN2019/111716 filed Oct. 17, 2019, which claims the priority of Invention Patent Application No. 201910366778.7, filed to the China National Intellectual Property Administration on May 5, 2019, and the entire contents of which are herein incorporated by reference.

FIELD OF THE INVENTION

The present disclosure relates to the technical field of weather radars, in particular to a dual-polarization radar.

BACKGROUND OF THE INVENTION

The existing dual-polarization weather radars are mainly divided into: an AHV system of alternate transmission and simultaneous reception and an SHV system of simultaneous transmission and reception. Both the SHV and AHV systems need to set up two receiving channels, resulting in a relatively high architecture scale and complexity; and at the same time, the equipment cost remains high. Especially for multi-channel phased array radars, the large scale, the complexity and the equipment cost are embodied more obviously.

SUMMARY OF THE INVENTION

Embodiments of the present invention provide a dual-polarization radar, in order to solve the technical problems of complex structure and large scale of a receiving module of the dual-polarization radar in the prior art.

In order to solve the above technical problems, some embodiments of the present invention provide a dual-polarization radar, including: a transmission module, a receiving module, a transmit-receive switch module, an antenna having a first polarization direction, and an antenna having a second polarization direction;
the transmission module is configured to transmit a first pulse signal and a second pulse signal having different radio frequencies;
the receiving module is configured to receive a backscattered echo signal of the first pulse signal and the second pulse signal;
the transmit-receive switch module is configured to transmit the first pulse signal to the antenna having the first polarization direction, transmit the second pulse signal to the antenna having the second polarization direction, and transmit an echo signal having the first polarization direction and an echo signal having the second polarization direction to the receiving module;
the antenna having the first polarization direction is configured to transmit the first pulse signal and receive the echo signal having the first polarization direction;
the antenna having the second polarization direction is configured to transmit the second polarization pulse signal and receive the echo signal having the second polarization direction;
the dual-polarization radar further includes: a signal synthesis module; and
the signal synthesis module is configured to receive the echo signal having the first polarization direction and the echo signal having the second polarization direction, synthesize the echo signal having the first polarization direction and the echo signal having the second polarization direction as the backscattered echo signal, and transmit the backscattered echo signal to the receiving module.

According to some embodiments, the transmission module is configured to generate a pulse pair signal, and the pulse pair signal includes the first pulse signal and the second pulse signal having different radio frequencies.

According to some embodiments, the pulse pair signal includes: two or more pulse pairs; and among the two or more pulse pairs, the pulse width of the first pulse pair is greater than the pulse widths of other pulse pairs.

According to some embodiments, the transmission module includes: a signal generator and a frequency conversion circuit;
the signal generator is configured to generate the first pulse signal and the second pulse signal having the same waveform; and
the frequency conversion circuit is configured to convert the first pulse signal and the second pulse signal into two radio frequency signals having different radio frequencies, and then transmit the radio frequency signals to the transmit-receive switch module.

According to some embodiments, the transmission module includes: a signal generator and a frequency conversion circuit;
the signal generator is configured to generate the first pulse signal and the second pulse signal which are the same; and
the frequency conversion circuit is configured to convert the first pulse signal and the second pulse signal into two radio frequency signals having different radio frequencies, and then transmit the radio frequency signals to the transmit-receive switch module.

According to some embodiments, the transmit-receive switch module includes: a first gating module, a second gating module and a third gating module;
the input end of the first gating module is connected to the transmission module for obtaining the pulse pair signal, and gating the second gating module to transmit the first pulse signal to the antenna having the first polarization direction, or gating the third gating module to transmit the second pulse signal to the antenna having the second polarization direction;
the second gating module further receives the echo signal having the first polarization direction and transmits the echo signal having the first polarization direction to the signal synthesis module; and
the third gating module further receives the echo signal having the second polarization direction and transmits the echo signal having the second polarization direction to the signal synthesis module.

According to some embodiments, the first gating module is a radio frequency switch, and the second gating module and the third gating module are radio frequency switches or circulators.

According to some embodiments, the pulse pair signals are two pulse signals immediately adjacent in time, and the time interval between the two pulses is not greater than the pulse width of each pulse.

According to some embodiments, the pulse pair signals are two pulse signals immediately adjacent in time, and the time interval between the two pulses is not greater than 1 us.

According to some embodiments, the transmission module includes a first transmission module and a second transmission module, and the first transmission module and the second transmission module synchronously transmit the first pulse signal and the second pulse signal having different radio frequencies.

According to some embodiments, the transmit-receive switch module includes: a first gating module and a second gating module;

the input end of the first gating module is connected to the first transmission module for obtaining the first pulse signal and transmitting the first pulse signal to the antenna having the first polarization direction, and the first gating module further receives the echo signal having the first polarization direction and transmits the echo signal having the first polarization direction to the signal synthesis module; and the input end of the second gating module is connected to the second transmission module for obtaining the second pulse signal and transmitting the second pulse signal to the antenna having the second polarization direction, and the second gating module further receives the echo signal having the second polarization direction and transmits the echo signal having the second polarization direction to the signal synthesis module.

According to some embodiments, the first gating module and the second gating module are radio frequency switches or circulators.

According to some embodiments, each of the first pulse signal and the second pulse signal includes two or more single pulses, and among the two or more single pulses, the pulse width of the first pulse is greater than the pulse widths of other pulses.

According to some embodiments, each of the first transmission module and the second transmission module includes: a signal generator and a frequency conversion circuit.

According to some embodiments, the signal generator includes: a direct digital frequency synthesizer DDS or a digital-to-analog converter DA.

According to some embodiments, the frequency conversion circuit includes: a first mixer or a frequency multiplier.

According to some embodiments, the signal generator and the frequency conversion circuit are integrated together.

According to some embodiments, the receiving module includes: a receiver; and the receiver is connected to the signal synthesis module to receive the backscattered echo signal.

According to some embodiments, the receiving module includes: an analog-to-digital conversion circuit and a second mixer; and the analog-to-digital conversion circuit is connected to the signal synthesis module through the second mixer.

According to some embodiments, the signal synthesis module includes: a power divider, a second low noise amplifier and a third low noise amplifier;

the output end of the power divider is connected to the receiving module;

two input ends of the power divider are respectively connected to the output end of the second low noise amplifier and the output end of the third low noise amplifier; and the input end of the second low noise amplifier and the input end of the third low noise amplifier are respectively connected to the transmit-receive switch module to obtain the echo signal having the first polarization direction and the echo signal having the second polarization direction.

One or more technical solutions provided in the embodiments of the present application at least have some or all of the following technical effects or advantages:

the dual-polarization radar provided in the embodiments of the present application alternately outputs pulse pair signals having different center frequencies through the transmission module, and is respectively connected to the antenna having the first polarization direction, the antenna having the second polarization direction and the receiving module through the transmit-receive switch module, so as to alternately transmit monitoring signals in two polarization directions, thereby avoiding cross coupling caused by the simultaneous transmission of two polarization signals and reducing measurement errors; further, the dual-polarization radar transmits the echo signal having the first polarization direction and the echo signal having the second polarization direction to the receiving module through the signal synthesis module to complete the reception of the echo signals, realize the optimization of the radar structure and reduce the structure of one receiving channel, thereby greatly reducing the scale and the complexity of the radar structure, and better facilitating mass-scale use; at the same time, the dual-polarization radar continuously transmits pulse pair signals containing pulses of different frequencies at short intervals through the same transmission module within each transmission period, or synchronously transmits pulse signals having different frequencies through different transmission modules, thereby overcoming the defect of poor correlation of the echo signals caused by the large transmission time interval in the alternating transmission mode under the existing AHV system, and the monitoring accuracy is ensured as a result; and further, in order to avoid the problem that the echoes in the two polarization directions are mixed together and are difficult to distinguish, the pulses in the two polarization directions adopt different radio frequencies and intermediate frequencies, thereby realizing the high correlation and dual polarization target discrimination in the alternate transmission mode, and achieving good radar monitoring performance. On the other hand, the dual-polarization radar is set to transmit continuous pulse pairs having different pulse widths, which can cover a longer distance library through wide pulse pairs, and solve the problem of excessively long blind areas of the wide pulse pairs through narrow pulse pairs, thereby solving derivative defects caused by structure optimization, and the dual-polarization radar still has good radar monitoring performance while its structure is optimized.

DETAILED DESCRIPTION OF EMBODIMENTS

Embodiments of the present application provide a dual-polarization radar, in order to solve the technical problems of complex structure and large scale of a receiving module of the dual-polarization radar in the prior art.

In order to better understand the above technical solutions, the above technical solutions will be described in detail below in combination with the drawings and specific embodiments. It should be understood that the embodiments of the present invention and the specific features in the embodiments are detailed descriptions of the technical solutions of the present application, instead of limitations to the technical solutions of the present application, and the embodiments of the present application and the technical features in the embodiments can be combined with each other if there is no conflict.

Compared with the dual-polarization weather radar in the prior art, the dual-polarization radar in the embodiments of the present invention greatly simplifies the structure, reduces the scale of its components, and greatly reduces the use cost, and is especially used in phase array radars and other multi-channel products; and while simplifying the structure, the embodiments provided by the present application can still have comparable performance with the existing dual-polarization radar, and even slightly better than that of the dual-polarization radars based on AHV and SHV systems. The embodiments of the present application will be described in detail below.

Figure 1:
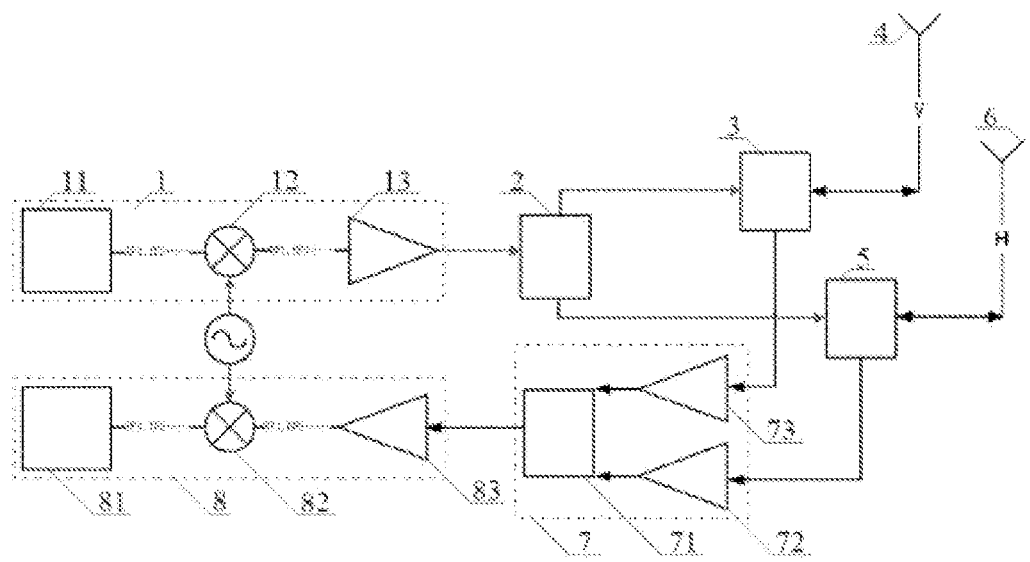
FIG. 1 is a schematic structural diagram of a dual-polarization radar provided by some embodiments of the present invention.

Referring to FIG. 1, the dual-polarization radar provided by some embodiments of the present invention includes: a transmission module 1, a receiving module 8, a transmit-receive switch module, an antenna 4 having a first polarization direction, and an antenna 6 having a second polarization direction.

The transmission module 1 is configured to generate a pulse pair signal, and the pulse pair signal includes a first pulse signal and a second pulse signal having different radio frequencies.

Figure 2:
FIG. 2 is a pulse timing control diagram of the dual-polarization radar structure in the embodiment shown in FIG. 1.

Referring to FIG. 2, according to one embodiment, the pulse pair signals are two pulse signals immediately adjacent in time, and the time interval between the two pulses is very small, such as 1 us or less. In other words, the time interval between the two radio frequency signals is very short, therefore the correlation between two echo signals can be improved, and good monitoring accuracy can be ensured.

The receiving module 8 is configured to receive a backscattered echo signal of the first pulse signal and the second pulse signal, that is, the echo signal of two polarization directions.

The transmit-receive switch module includes a first gating module 2, a second gating module 3 and a third gating module 5, which are configured to transmit the first pulse signal to the antenna 4 having the first polarization direction, transmit the second pulse signal to the antenna 6 having the second polarization direction, and transmit an echo signal having the first polarization direction and an echo signal having the second polarization direction to the receiving module 8.

The dual-polarization radar further includes: a signal synthesis module 7; and the signal synthesis module 7 is configured to receive the echo signal having the first polarization direction and the echo signal having the second polarization direction, synthesize the echo signal having the first polarization direction and the echo signal having the second polarization direction as the backscattered echo signal, and transmit the backscattered echo signal to the receiving module 8 to realize a single receiving channel structure.

The antenna 4 having the first polarization direction is configured to transmit the first pulse signal and receive the echo signal having the first polarization direction; and the antenna 6 having the second polarization direction is configured to transmit the second polarization pulse signal and receive the echo signal having the second polarization direction.

Referring to FIG. 2, further, the pulse pair signal includes: two or more pulse pairs; and among the two or more pulse pairs, the pulse width of the first pulse pair is greater than the pulse widths of other pulse pairs.

It should be noted that, since the two radio frequency signals are very close to each other, the echoes in the two polarization directions will be aliased together and cannot be distinguished at all; and in order to distinguish the polarization directions of the echoes, in the present embodiment, different radio frequencies are adopted in the first radio frequency signal and the second radio frequency signal, so that the echoes in the two polarization directions can be distinguished.

On the other hand, when radar monitoring is executed, the transmission module transmits two or more pulse pairs within one transmission period; and each pulse pair is composed of a horizontally polarized pulse H and a vertically polarized pulse V, among the two or more consecutive pulse pairs, the width of the first pulse pair is greater than the widths of the subsequent pulse pairs. That is, narrow pulse pairs are disposed behind the wide pulse pair to achieve the purpose of solving blind areas, thereby avoiding the occurrence of larger blind areas.

Of course, it is worth noting that the number of pulse pairs can also be one, and there may be blind areas.

In a specific embodiment, the signal transmission module 1 can include: a signal generator 11 and a frequency conversion circuit 12; the signal generator 11 is configured to generate the first pulse signal and the second pulse signal having the same waveform and different intermediate frequencies; and the frequency conversion circuit 12 is configured to convert the first pulse signal and the second pulse signal into two radio frequency signals having different radio frequencies, and then transmit the radio frequency signals to the transmit-receive switch module.

Or, the signal transmission module 1 can include: a signal generator 11 and a frequency conversion circuit 12; the signal generator 11 is configured to generate the first pulse signal and the second pulse signal which are the same; and the frequency conversion circuit 12 is configured to convert the first pulse signal and the second pulse signal into two radio frequency signals having different radio frequencies, and then transmit the radio frequency signals to the transmit-receive switch module.

The signal generator 11 can include a direct digital frequency synthesizer DDS or a digital-to-analog converter DA for generating the pulse pair signal.

The frequency conversion circuit 12 can include: a first mixer or a frequency multiplier; and of course, it can also be other frequency adjustment devices.

According to some embodiments, the signal generator 11 and the frequency conversion circuit 12 can be integrated together, such as a single RFSOC chip.

The receiving module 8 can include a receiver; and the receiver is connected to the signal synthesis module to receive the backscattered echo signal.

Or, the receiving module 8 can include: an analog-to-digital conversion circuit AD81 and a second mixer 82; and the analog-to-digital conversion circuit AD81 is connected to the signal synthesis module 7 through the second mixer 82 to realize the collection and conversion of an echo composite signal.

Optionally, the receiving channel receiving module 8 can further include: a first low noise amplifier 83; and the first low noise amplifier 83 is connected in series between the second mixer 82 and the output end of the signal synthesizer 7, so as to realize the filtering, amplification and reception of the echo signal of the channel and improve the signal-to-noise ratio.

According to a specific embodiment, the signal synthesis module includes: a power divider 71, a second low noise amplifier 73 and a third low noise amplifier 72; the output end of the power divider 71 is connected to the receiving module 8; two input ends of the power divider 71 are respectively connected to the output end of the second low noise amplifier 73 and the output end of the third low noise amplifier 72; and the input end of the second low noise amplifier 73 and the input end of the third low noise amplifier 72 are respectively connected to the transmit-receive switch module to obtain the echo signal having the first polarization direction and the echo signal having the second polarization direction.

In a specific embodiment, the transmit-receive switch module includes: a first gating module 2, a second gating module 3 and a third gating module 5; the input end of the first gating module 2 is connected to the transmission module 1 for obtaining the pulse pair signal, and gating the second gating module 3 to transmit the first pulse signal to the antenna 4 having the first polarization direction, or gating the third gating module 5 to transmit the second pulse signal to the antenna 6 having the second polarization direction; the second gating module 3 further receives the echo signal having the first polarization direction and transmits the echo signal having the first polarization direction to the signal synthesis module 7; and the third gating module 5 further receives the echo signal having the second polarization direction and transmits the echo signal having the second polarization direction to the signal synthesis module 7.

In a specific embodiment, the first gating module 2 can be a radio frequency switch, and the second gating module 3 and the third gating module 5 can be radio frequency switches or circulators.

In the embodiment of the present invention, compared with the existing dual-receiving module system, it is optimized and is set as a single receiving module to reduce the complexity of the structure and the scale of the components, which will be described in detail below.

The antenna 4 having the first polarization direction is connected to the second gating module 3 to transmit the first radio frequency signal or receive the echo signal having the first polarization direction; and the antenna 6 having the second polarization direction is connected to the third gating module 5 to transmit the second radio frequency signal or receive the echo signal having the second polarization direction.

Specifically, during the transmission, the first gating module 2 gates the second gating module 3 or the third gating module 5 under the action of a gating control signal, that is, gates the antenna 4 having the first polarization direction or the antenna 6 having the second polarization direction to transmit polarized waves through a polarization feed port of the corresponding antenna.

Correspondingly, when receiving the echo signals, the two input ends of the signal synthesis module 7 are respectively connected to the second gating module 3 and the third gating module 5 to obtain the echo signal having the first polarization direction and the echo signal having the second polarization direction, and synthesize the same as the back-scattered echo signal.

Specifically, when horizontally polarized waves and vertically polarized waves emitted by the antenna meet a target, backscattered echoes are generated and transmitted to the radar antenna. After the echoes reach the dual-polarization antenna, a vertical polarization port can only receive the vertically polarized waves emitted by itself, and a horizontal polarization port can only receive the horizontally polarized waves emitted by itself in an ideal state, the vertically polarized waves and the horizontally polarized waves enter the signal synthesis module 7 through the second gating module 3 and the third gating module 5 respectively, and enter the receiving module 8 for analysis after being synthesized into a signal.

Generally speaking, the moving speed of a weather target generally does not exceed 60 m/s, the corresponding Doppler frequency shift is in the order of kHz, as long as the non-coincidence frequency interval of the two radio frequency signals reaches the order of MHz, the receiver can distinguish the two radio frequency signals, and then can distinguish the vertically polarized echo and the horizontally polarized echo.

It is worth noting that in the present embodiment, the time interval of the two pulses in the pulse pair signal is controlled within the time corresponding to the pulse width of each pulse, instead of the pulse period interval in the existing AHV mode, so the echo correlation is higher than that of the AHV mode. For example, under the conditions of working frequency of 1 GHz, spectral width distribution of 16 m/s and a pulse width of 100 us, the correlation coefficient of the two polarized waves is 0.998, which is close to the zero delay correlation coefficient in the SHV mode; that is to say, the performance of the echo correlation of the optimization solution of the single receiving module provided in the present embodiment is the same as that of the existing radar adopting the SHV system, and is better than that of the existing radar adopting the AHV system.

The above functional structures will be specifically described below.

The transmission module includes: a signal generator 11 and a frequency conversion circuit 12; and the signal generator 11 is connected to the frequency conversion circuit 12 to convert the pulse pair signals into a first polarization direction radio frequency signal and a second polarization direction radio frequency signal. According to one embodiment, the transmission is divided into two sub-pulses, and the signal generator 11 generates two signals IF1, IF2, which are immediately adjacent in time and have the same waveform and different center frequencies, and the signals are converted into radio frequency signals RF1, RF2 by the frequency conversion circuit 12; or, this process can also be that the signal generator 1 generates two identical signals, and then the frequency conversion circuit 12 realizes RF1 and RF2, for example, the rapid switching of local oscillator frequency in the mixer.

According to some embodiments, the signal generator 11 can adopt a direct digital frequency synthesizer DDS or a driver amplifier DA. The frequency conversion circuit 12 can adopt a mixer or a frequency multiplier.

The frequency conversion circuit 12 can be connected to the first gating module 2 to transmit the first polarization direction radio frequency signal and the second polarization direction radio frequency signal.

In one embodiment, the transmission module 1 can further include: an amplifier 13 and a filter (not shown); and the amplifier 13 and the filter are connected in series and then are connected between the frequency conversion circuit 12 and the first gating module 2.

The receiving module 8 can include: an analog-to-digital conversion circuit AD 81 and a second mixer 82; and the analog-to-digital conversion circuit AD81 is connected to the signal synthesis module 7 through the second mixer 82 to realize the collection and conversion of the echo composite signal.

In one embodiment, the receiving module 8 can further include: a first low noise amplifier 83; and the first low noise amplifier 83 is connected in series between the second mixer 82 and the output end of the signal synthesizer 7, so as to realize the amplification and reception of the echo signal of the channel and improve the signal-to-noise ratio.

In some embodiments, the signal synthesis module 7 can include: a power divider 71, a second low noise amplifier 73 and a third low noise amplifier 72; the output end of the power divider 71 is connected to the receiving module 8; the two input ends of the power divider 71 are respectively connected to the second gating module 3 and the third gating module 5 through the second low noise amplifier 73 and the third low noise amplifier 72, so as to combine the two paths of echo signals into one path, so that the signal-to-noise ratio is higher than that when the second gating module 3 and the third gating module 5 are directly connected to the power divider 71 thereafter, and the obtained signal-to-noise ratio value exceeds the noise coefficient of the power divider 71, thereby maintaining a higher signal-to-noise ratio.

In some embodiments, the first gating module 2, the second gating module 3 and the third gating module 5 are all used for gating. The first gating module 2 can be selected as a radio frequency switch, and the second gating module 3 and the third gating module 5 can be selected as radio frequency switches or circulators.

Figure 3:
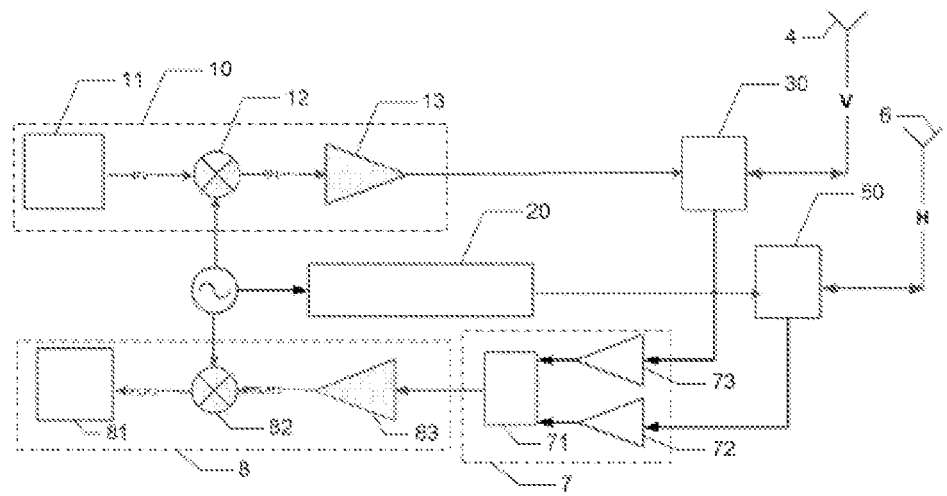
FIG. 3 is a schematic structural diagram of a dual-polarization radar provided by some other embodiments of the present invention.
Figure 4A:
FIG. 4a is a pulse timing control diagram of a first transmission module in the dual-polarization radar structure in the embodiment shown in FIG. 3.
Figure 4B:
FIG. 4b is a pulse timing control diagram of a second transmission module in the dual-polarization radar structure in the embodiment shown in FIG. 3.

FIG. 3 shows a schematic structural diagram of a dual-polarization radar provided by some other embodiments of the present invention. FIG. 4a is a pulse timing control diagram of a first transmission module 10 of the dual-polarization radar structure in the embodiment shown in FIG. 3. FIG. 4b is a pulse timing control diagram of a second transmission module 20 of the dual-polarization radar structure in the embodiment shown in FIG. 3. Referring to FIG. 3, the dual-polarization radar provided by some other embodiments of the present invention includes: a transmission module 1, a receiving module 8, transmit-receive switch module 30, 50, an antenna 4 having a first polarization direction, and an antenna 6 having a second polarization direction.

Different from the embodiment shown in FIG. 1, in the embodiment shown in FIG. 3, the transmission module 1 includes two transmission modules, that is, a first transmission module 10 and a second transmission module 20. The first transmission module 10 and the second transmission module 20 are configured to simultaneously transmit a first pulse signal and a second pulse signal having the same waveform and different radio frequencies. For example, the first pulse signal can be a horizontally polarized pulse H, and the second pulse signal can be a vertically polarized pulse V. Or, the first pulse signal can be a vertically polarized pulse V, and the second pulse signal can be a horizontally polarized pulse H. Since the first transmission module 10 and the second transmission module 20 simultaneously transmit the first pulse signal and the second pulse signal having different radio frequencies, the correlation between the two echo signals can be better improved, and good monitoring accuracy can be ensured.

The receiving module 8 is configured to receive a backscattered echo signal of the first pulse signal and the second pulse signal, that is, the echo signal of two polarization directions.

The transmit-receive switch module 30, 50 includes a first gating module 30 and a second gating module 50, which are configured to transmit the first pulse signal to the antenna 4 having the first polarization direction, transmit the second pulse signal to the antenna 6 having the second polarization direction, and transmit an echo signal having the first polarization direction and an echo signal having the second polarization direction to the receiving module 8.

The dual-polarization radar further includes: a signal synthesis module 7; and the signal synthesis module 7 is configured to receive the echo signal having the first polarization direction and the echo signal having the second polarization direction, synthesize the echo signal having the first polarization direction and the echo signal having the second polarization direction as the backscattered echo signal, and transmit the backscattered echo signal to the receiving module 8 to realize a single receiving channel structure.

The antenna 4 having the first polarization direction is configured to transmit the first pulse signal and receive the echo signal having the first polarization direction; and the antenna 6 having the second polarization direction is configured to transmit the second polarization pulse signal and receive the echo signal having the second polarization direction.

Specifically, the antenna 4 having the first polarization direction is connected to the first gating module 30 to transmit the first radio frequency signal or receive the echo signal having the first polarization direction; and the antenna 6 having the second polarization direction is connected to the second gating module 50 to transmit the second radio frequency signal or receive the echo signal having the second polarization direction.

Specifically, during the transmission, the first gating module 30 or the second gating module 50 is gated, that is, the antenna 4 having the first polarization direction or the antenna 6 having the second polarization direction is gated, so as to transmit polarized waves through a polarization feed port of the corresponding antenna.

Correspondingly, when receiving the echo signals, the two input ends of the signal synthesis module 7 are respectively connected to the first gating module 30 and the second gating module 50 to obtain the echo signal having the first polarization direction and the echo signal having the second polarization direction, and synthesize the same as the backscattered echo signal.

Specifically, when horizontally polarized waves and vertically polarized waves emitted by the antenna meet the target, backscattered echoes are generated and transmitted to the radar antenna. After the echoes reach the dual-polarization antenna, the vertical polarization port can only receive the vertically polarized waves emitted by itself, and the horizontal polarization port can only receive the horizontally polarized waves emitted by itself in the ideal state, the vertically polarized waves and the horizontally polarized waves enter the signal synthesis module 7 through the first gating module 30 and the second gating module 50 respectively, and enter the receiving module 8 for analysis after being synthesized into a signal.

Referring to FIG. 4a and FIG. 4b, in one embodiment, each of the first pulse signal and the second pulse signal includes two or more single pulses, and among the two or more single pulses, the pulse width of the first pulse is greater than the pulse widths of other pulses.

It should be noted that, since the two radio frequency signals are very close to each other, the echoes in the two polarization directions will be aliased together and cannot be distinguished at all; and in order to distinguish the polarization directions of the echoes, in the present embodiment, the first radio frequency signal and the second radio frequency signal use different radio frequencies, so that the echoes in the two polarization directions can be distinguished.

On the other hand, when radar monitoring is executed, within one transmission period, the first transmission module 10 can transmit two or more horizontally polarized single pulses, and at the same time, the second transmission module 20 can transmit two or more vertically polarized single pulses. Or, the first transmission module 10 can transmit two or more vertically polarized single pulses, and at the same time, the second transmission module 20 can transmit two or more horizontally polarized single pulses. Among the two or more consecutive single pulses, the width of the first single pulse is greater than the widths of the subsequent single pulses. That is, narrow pulses are disposed behind the wide pulse to achieve the purpose of solving blind areas, thereby avoiding the occurrence of large blind areas.

In a specific embodiment, each of the first transmission module 10 and the second transmission module 20 can include: a signal generator 11 and a frequency conversion circuit 12. The signal generator 11 can include: a direct digital frequency synthesizer DDS or a digital-to-analog converter DA for generating pulse signals. The frequency conversion circuit 12 can include: a first mixer or a frequency multiplier; and of course, it can also be other frequency adjustment devices.

According to some embodiments, the signal generator 11 and the frequency conversion circuit 12 can be integrated together, such as a single RFSOC chip.

In one embodiment, each of the first transmission module 10 and the second transmission module 20 can include: an amplifier 13 and a filter (not shown); and the amplifier 13 and the filter are connected in series and then are connected between the frequency conversion circuit 12 and the first gating module 30 or the second gating module 50.

The receiving module 8 can include: a receiver; and the receiver is connected to the signal synthesis module to receive the backscattered echo signal.

Or, the receiving module 8 can include: an analog-to-digital conversion circuit AD 81 and a second mixer 82; and the analog-to-digital conversion circuit AD81 is connected to the signal synthesis module 7 through the second mixer 82 to realize the collection and conversion of the echo composite signal.

Optionally, the receiving module 8 can further include: a first low noise amplifier 83; and the first low noise amplifier 83 is connected in series between the second mixer 82 and the output end of the signal synthesizer 7, so as to realize the filtering, amplification and reception of the echo signal of the channel and improve the signal-to-noise ratio.

In a specific embodiment, the transmit-receive switch module includes: the first gating module 30 and the second gating module 50; the input end of the first gating module 30 is connected to the first transmission module 10 for obtaining the first pulse signal, and transmitting the first pulse signal to the antenna 4 having the first polarization direction; the input end of the second gating module 50 is connected to the second transmission module 20 for obtaining the second pulse signal and transmitting the second pulse signal to the antenna 6 having the second polarization direction; the first gating module 30 further receives the echo signal having the first polarization direction and transmits the echo signal having the first polarization direction to the signal synthesis module 7; and the second gating module 50 further receives the echo signal having the second polarization direction and transmits the echo signal having the second polarization direction to the signal synthesis module 7. The first gating module 30 and the second gating module 50 can be radio frequency switches or circulators.

According to a specific embodiment, the signal synthesis module 7 can include: a power divider 71, a second low noise amplifier 73 and a third low noise amplifier 72; the output end of the power divider 71 is connected to the receiving module 8; the two input ends of the power divider 71 are respectively connected to the output end of the second low noise amplifier 73 and the output end of the third low noise amplifier 72; and the input end of the second low noise amplifier 73 and the input end of the third low noise amplifier 72 are respectively connected to the transmit-receive switch module to obtain the echo signal having the first polarization direction and the echo signal having the second polarization direction.

Specifically, the two input ends of the power divider 71 are respectively connected to the first gating module 30 and the second gating module 50 through the second low noise amplifier 73 and the third low noise amplifier 72, so as to combine the two paths of echo signals into one path, so that the signal-to-noise ratio is higher than that when the first gating module 30 and the second gating module 50 are directly connected to the power divider 71 thereafter, and the obtained signal-to-noise ratio value exceeds the noise coefficient of the power divider 71, thereby maintaining a higher signal-to-noise ratio.

The above-mentioned embodiment of the present invention is similar to the embodiment shown in FIG. 3, and the existing dual-receiving module system is optimized and is set as the single receiving module to reduce the complexity of the structure and the scale of components. In addition, since the two transmission modules correspond to radiating antennas in two different polarization directions respectively, and the two transmission modules transmit signals of different frequencies, the transmitted waves in the two polarization directions can be distinguished only by frequency division, time sharing work is not needed, and the correlation performance of the two polarization directions reaches the ideal 1, thus further improving the correlation of the echo signals and ensuring the monitoring accuracy.

The embodiments of the present invention further propose a weather radar monitoring method based on the dual-polarization radar in the above-mentioned embodiment.

One or more technical solutions provided in the embodiments of the present application have at least some or all of the following technical effects or advantages:

the dual-polarization radar provided in the embodiments of the present application alternately outputs pulse pair signals having different center frequencies through the transmission module, and is respectively connected to the antenna having the first polarization direction, the antenna having the second polarization direction and the receiving module through the transmit-receive switch module, so as to alternately transmit monitoring signals in two polarization directions, thereby avoiding cross coupling caused by the simultaneous transmission of two polarization signals and reducing measurement errors; further, the dual-polarization radar transmits the echo signal having the first polarization direction and the echo signal having the second polarization direction to the receiving module through the transmit-receive switch module to complete the reception of the echo signals, realize the optimization of the radar structure and reduce one receiving channel, thereby greatly reducing the scale and the complexity of the radar structure, and better facilitating mass-scale use; at the same time, the dual-polarization radar continuously transmits pulse pair signals at short intervals through the same transmission module within each transmission period, or synchronously transmits pulse signals having different frequencies through different transmission modules, thereby overcoming the defect of poor correlation of the echo signals caused by the large transmission time interval in the alternating transmission mode under the existing AHV system, and the monitoring accuracy is ensured as a result; and further, in order to avoid the problem that the echoes in the two polarization directions are mixed together and are difficult to distinguish, the pulses in the two polarization directions adopt different radio frequencies and intermediate frequencies, thereby realizing the high correlation and dual polarization target discrimination in the alternate transmission mode, and achieving good radar monitoring performance. On the other hand, the dual-polarization radar is set to transmit continuous pulse pairs having different pulse widths, which can cover a relative long distance library through wide pulse, and solve the problem of excessively long blind areas of the wide pulse through narrow pulse, thereby solving derivative defects caused by structure optimization, and the dual-polarization radar still has good radar monitoring performance while its structure is optimized.

Finally, it should be noted that the above specific embodiments are only used for illustrating the technical solutions of the present invention, rather than limiting. Although the present invention has been described in detail with reference to examples, those of ordinary skilled in the art should understand that modifications or equivalent replacements can be made to the technical solutions of the present invention, without departing from the spirit and scope of the technical solution of the present invention, and these modifications or equivalent replacements shall fall within the scope of the claims of the present invention.

The invention claimed is:

1. A dual-polarization radar, comprising: a transmission module (1), a receiving module (8), a transmit-receive switch module, an antenna (4) having a first polarization direction, and an antenna (6) having a second polarization direction; wherein:
the transmission module (1) is configured to transmit a first pulse signal and a second pulse signal having different radio frequencies;
the receiving module (8) is configured to receive a backscattered echo signal of the first pulse signal and the second pulse signal;
the transmit-receive switch module (2, 3, 5; 30, 50) is configured to transmit the first pulse signal to the antenna (4) having the first polarization direction, transmit the second pulse signal to the antenna (6) having the second polarization direction, and transmit an echo signal having the first polarization direction and an echo signal having the second polarization direction to the receiving module (8);
the antenna (4) having the first polarization direction is configured to transmit the first pulse signal and receive the echo signal having the first polarization direction;
the antenna (6) having the second polarization direction is configured to transmit the second pulse signal and receive the echo signal having the second polarization direction;
the dual-polarization radar further comprises: a signal synthesis module (7); and
the signal synthesis module (7) is configured to receive the echo signal having the first polarization direction and the echo signal having the second polarization direction, synthesize the echo signal having the first polarization direction and the echo signal having the second polarization direction as the backscattered echo signal, and transmit the backscattered echo signal to the receiving module (8);
wherein the transmission module (1) is configured to generate a pulse pair signal;
wherein the pulse pair signal comprises: two or more pulse pairs; and among the two or more pulse pairs, a pulse width of each pulse of a first pulse pair is greater than pulse widths of pulses of other pulse pairs;
each of the two or more pulse pairs is constituted by the first pulse signal and the second pulse signal having different radio frequencies and being immediately adjacent in time;
a time interval between the first pulse signal and the second pulse signal is not greater than the pulse width of each pulse;
the first pulse signal and the second pulse signal are alternately transmitted; and
the first pulse signal and the second pulse signal are respectively a horizontally polarized pulse and a vertically polarized pulse, or the first pulse signal and the second pulse signal are respectively a vertically polarized pulse and a horizontally polarized pulse.

2. The dual-polarization radar of claim 1, wherein the transmission module (1) comprises: a signal generator (11) and a frequency conversion circuit (12);
the signal generator (11) is configured to generate the first pulse signal and the second pulse signal having the same waveform; and
the frequency conversion circuit (12) is configured to convert the first pulse signal and the second pulse signal into two radio frequency signals having different radio frequencies, and then transmit the radio frequency signals to the transmit-receive switch module.

3. The dual-polarization radar of claim 2, wherein the signal generator (11) comprises: a direct digital frequency synthesizer DDS or a digital-to-analog converter DA.

4. The dual-polarization radar of claim 3, wherein the frequency conversion circuit (12) comprises: a first mixer or a frequency multiplier.

5. The dual-polarization radar of claim 4, wherein the receiving module (8) comprises: an analog-to-digital conversion circuit (81) and a second mixer (82); and the analog-to-digital conversion circuit (81) is connected to the signal synthesis module (7) through the second mixer (82).

6. The dual-polarization radar of claim 3, wherein the signal generator (11) and the frequency conversion circuit (12) are integrated together.

7. The dual-polarization radar of claim 1, wherein the transmission module (1) comprises: a signal generator (11) and a frequency conversion circuit (12);
the signal generator (11) is configured to generate the first pulse signal and the second pulse signal which are the same; and
the frequency conversion circuit (12) is configured to convert the first pulse signal and the second pulse signal into two radio frequency signals having different radio frequencies, and then transmit the radio frequency signals to the transmit-receive switch module.

8. The dual-polarization radar of claim 7, wherein the signal generator (11) comprises: a direct digital frequency synthesizer DDS or a digital-to-analog converter DA.

9. The dual-polarization radar of claim 1, wherein the transmit-receive switch module (2, 3, 5) comprises: a first gating module (2), a second gating module (3) and a third gating module (5);
   a first input end of the first gating module (2) is connected to the transmission module (1) for obtaining the pulse pair signal, and gating the second gating module (3) to transmit the first pulse signal to the antenna (4) having the first polarization direction, or gating the third gating module (5) to transmit the second pulse signal to the antenna (6) having the second polarization direction;
   the second gating module (3) further receives the echo signal having the first polarization direction and transmits the echo signal having the first polarization direction to the signal synthesis module (7); and
   the third gating module (5) further receives the echo signal having the second polarization direction and transmits the echo signal having the second polarization direction to the signal synthesis module (7).

10. The dual-polarization radar of claim 9, wherein the first gating module (2) is a radio frequency switch, and the second gating module (3) and the third gating module (5) are radio frequency switches or circulators.

11. The dual-polarization radar of claim 1, wherein the time interval between the first pulse signal and the second pulse signal is not greater than 1 us.

12. The dual-polarization radar of claim 1, wherein the receiving module (8) comprises: a receiver; and
   the receiver is connected to the signal synthesis module (7) to receive the backscattered echo signal.

13. The dual-polarization radar of claim 1, wherein the receiving module (8) comprises a first low noise amplifier (83), and the signal synthesis module (7) comprises: a power divider (71), a second low noise amplifier (73) and a third low noise amplifier (72);
   a first output end of the power divider (71) is connected to the receiving module (8);
   two input ends of the power divider (71) are respectively connected to a second output end of the second low noise amplifier (73) and a third output end of the third low noise amplifier (72); and
   a second input end of the second low noise amplifier (73) and a third input end of the third low noise amplifier (72) are respectively connected to the transmit-receive switch module (2, 3, 5) to obtain the echo signal having the first polarization direction and the echo signal having the second polarization direction.

* * * * *